PREPARATION OF HIGHER BORON COMPOUNDS AND ALCOHOL DERIVATIVES THEREOF
Filed March 16, 1960
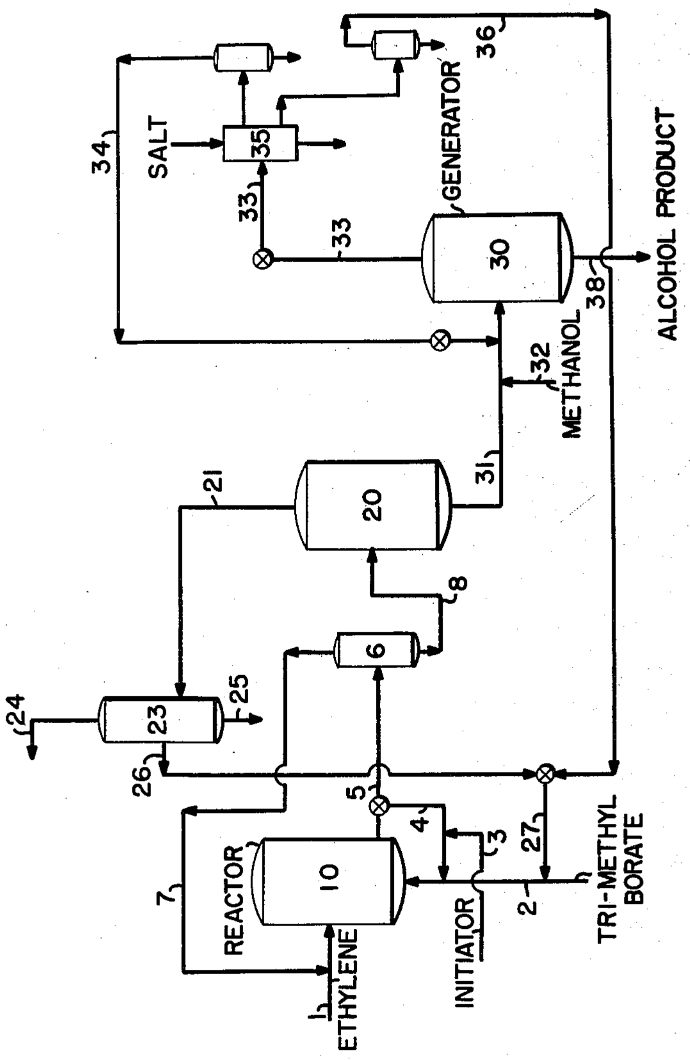
Clyde Lee Aldridge
Edward Allen Hunter Inventors
By Peter H. Smolka
Patent Attorney United States Patent Office 3,117,153
Patented Jan. 7, 1964

3,117,153

PREPARATION OF HIGHER BORON COMPOUNDS AND ALCOHOL DERIVATIVES THEREOF

Clyde Lee Aldridge, Baton Rouge, and Edward Allen Hunter, East Baton Rouge, La., assignors to Esso Research and Engineering Company, a corporation of Delaware Filed Mar. 16, 1960, Ser. No. 15,457
16 Claims. (Cl. 260—462)

This invention relates to a process for converting short chain organic boron compounds to longer chain organic boron compounds and alcohol derivatives thereof. More specifically it relates to the preparation of alkanols by a telomerization reaction involving an alkyl borate, e.g., methyl borate, with an olefin, e.g., ethylene, followed by alcoholysis or other appropriate treatment of the resulting telomer. The preferred embodiment of the invention comprises reacting methyl borate with ethylene in the presence of a peroxide initiator followed by treating the resulting telomer with methanol so as to liberate a higher molecular weight alcohol therefrom while regenerating the methyl borate, recovering the liberated alcohol, and recycling the methyl borate to the main reaction.

Modern chemical industry demands an ever increasing variety of alcohols for use as special solvents, as alcohol sulfate detergents, as ester-type plasticizers for vinyl resins, and as intermediates for the preparation of aldehydes and other chemicals, etc. One process recently developed for the production of higher alcohols is based on the reaction of an alkyl aluminum compound with ethylene, oxidation of the resulting longer chain alkyl aluminum growth product, and finally liberation of the corresponding longer chain alcohol. While this process has been adopted for large scale use, it has several disadvantages. Among these are the precautions required for handling the highly reactive alkyl aluminum reagent, the difficulty of controlling the oxidation step and the unavoidable formation of aldehyde impurities therein, and the impossibility of regenerating the alkyl aluminum compound for reuse except after complicated chemical processing.

It is an object of the present invention to provide a superior process for preparing the desired kind of alcohols via intermediates that are easily handled and converted to the alcohols. A more specific object is to provide a cyclic process allowing reuse of the principal reagent. These and other objects, ways of carrying them out and various advantages resulting therefrom will become more clearly apparent from the following description.

A new process has now been discovered involving the use of an alkoxy compound of boron as a telogen which is reacted with an olefin in the presence of a free radical source to provide a similar boron compound possessing an alkoxy substituent of greater chain length than the original compound. The required free radicals may be supplied in the form of unstable peroxygen or azo-bis-nitrile compounds or the like or by exposing the reaction mixture to ionizing radiation. The longer chain alkoxy boron compound is then reacted with water or an alcohol boiling lower than the product alcohol, preferably with an alcohol corresponding to the alkoxy substituent of the initial alkoxy boron reagent. In this manner the longer chain alkoxy radical of the product is split off in the form of a free alcohol and the original alkoxy boron compound is regenerated for further use.

Trimethyl borate constitutes a reagent possessing unique advantages in the present invention since it results in the formation of primary alcohols, with relatively little or no formation of secondary alcohols, and is easily regenerated for reuse in the reaction by treatment of the reaction product with methanol. On the other hand, ethylene is the preferred olefin since it results in the formation of relatively straight chain alcohols, i.e., alcohols having not more than about one branch for every ten carbon atoms of the main chain. However, where it is not important that relatively straight chain, primary alcohols be produced, or that the boron telogen be regenerable and reusable, it is possible to use both olefins higher than ethylene, e.g., propylene or amylenes, and borate esters containing alkyl radicals higher than methyl or still other alkoxy substituted boron compounds corresponding to the formula

wherein R is an alkyl radical of 1 to 6 carbon atoms, and R′ and R″ are selected from the group consisting of alkoxy radicals of 1 to 6 carbon atoms, alkyl radicals of 1 to 6 carbon atoms, hydrogen, chlorine, fluorine and the like. Compounds exemplifying this class include trihexyl borate, propoxy diethyl boron, butoxy methyl hydrogen boron, dimethoxy boron chloride, etc.

The telomerization reaction of this invention is carried out at temperatures between about 50° and 350° C., preferably 125° to 250° C., it being understood that where a thermally unstable compound, e.g., a peroxy compound, is used as the free radical source, the reaction temperature is set high enough for the specific compound in use to undergo appreciable decomposition. Reaction pressures are generally above atmospheric, e.g., between 10 and 2,000 or more p.s.i.g. For instance, the reaction may be carried out under ethylene partial pressures between about 20 and 1,000 p.s.i., preferably 50 and 750 p.s.i. Naturally, total reaction pressures will be greater than the aforementioned ethylene pressures since the telogen, e.g., alkyl borate, also possesses an appreciable vapor pressure. Higher ethylene pressures increase the concentration of ethylene in the reaction mixture and accordingly tend to produce telomers of greater chain length, while lower ethylene pressures favor the formation of relatively small growth products. Thus, for instance, when it is desired to produce n-propanol by addition of one ethylene unit to trimethyl borate, pressures near the low end of the aforementioned range and relatively high temperatures are recommended. When alcohols of 20 or more carbon atoms are desired, pressures in the upper part of the range and relatively low temperatures are preferred.

The initiators especially useful in this reaction include hydroperoxides, such as cumene hydroperoxide, as well as tetralin hydroperoxide and tertiary butyl hydroperoxide; regular peroxides such as benzoyl peroxide, di-tertiary butyl peroxide, di-2-phenylpropyl-2-peroxide, hydrogen peroxide; as well as other per-oxygen compounds such as sodium persulfate, potassium peracetate, etc. α,α-azo-bis-isobutyronitrile and similar α,α-azo-bis-alkyl nitriles, especially those having alkyl groups of 3 to 6 carbon atoms, such as those derived from 2-cyano butane, 2-cyano pentane, cyano cyclopentane, etc., are also useful as sources of free radicals. The initiator may most conveniently be supplied in the form of a solution, using either a solvent which is inert in the reaction, e.g., benzene, or preferably using a portion of the telogen as the solvent. The concentration of the initiator is not critical and may range, for instance, between 0.5% and 10% or even higher if the solubility characteristics of the initiator-solvent system permit. Moreover, the invention can also be practiced using other free radical sources, e.g., ionizing radiation such as that supplied by a conventional cobalt-60 source, a Van de Graff generator, an atomic pile, etc. When supplied in chemical form, the initiator is usually added in a concentration of about 1 to 20 grams per liter of liquid telogen charged, and is preferably added in increments such that the instantaneous initiator concentration in the reaction mixture never exceeds about 2 grams per liter.

The typical telomerization reaction involved may be represented by the following reaction:

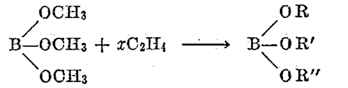

wherein R, R′ and R″ are alkyl groups of the formula $-(C_2H_4)_nCH_3$ wherein $n$ is an integer in the range from 0 to 20, preferably 0 to 10, with the proviso, however, that at least one of the said three alkyl groups contains at least three carbon atoms. In this manner trialkyl borates having as many as 15 to 40 carbon atoms per alkyl group can be prepared.

A simplified flow diagram of a preferred embodiment of the present process is shown in the attached drawing.

Referring to this drawing, ethylene, trimethyl borate and a trimethyl borate solution of di-tertiary butyl peroxide are pumped into reactor 10 via lines 1, 2 and 3, respectively. The peroxide is desirably injected into the telogen feed or, if recycling is practiced, then into recycle stream 4 of the telomerization product withdrawn from reactor 10 via line 5. The reactor is maintained at a temperature between 125° and 250° C., e.g. 200° C., and an ethylene partial pressure of 50 to 750 p.s.i., e.g. 500 p.s.i. is maintained therein. After allowing a residence time sufficient to carry the reaction to the desired degree of conversion, the reaction mixture is withdrawn via line 5 and a portion thereof may be recycled to the reactor via line 4. However, where a product with a minimum of branching is desired, any such recycling of telomer is best omitted. The other portion of the crude effluent is introduced into flash tower 6. Here unconverted ethylene is released from the reaction mixture and may be recycled to reactor 10 via line 7. Thereafter the mixture is passed via line 8 to distillation tower 20 where it is heated so as to strip out any unreacted trimethyl borate and preferably also all hydrocarbons having boiling points up to that of the desired higher alcohol product. When it is desired thus to strip hydrocarbon impurities from the product in tower 20, it is usually desirable to operate tower 20 at a bottoms temperature at least 5° C., and preferably at least 10° to 25° C. higher than the boiling point of the desired product alcohol at the pressure employed in tower 20. In order to avoid the need for unduly high bottoms temperatures, tower 20 is desirably operated at a reduced pressure. For instance, the bottoms temperature in tower 20 may be kept between about 100° and 400° C. and atmospheric or an appropriate subatmospheric pressure, depending on the boiling point of the desired product alcohol. On the other hand, where product purification is of no particular concern and the main function of tower 20 is to distill out only trimethyl borate, distillation at atmospheric pressure and a bottoms temperature between about 70° and 100° C. is adequate. This distillation tends to cause a desirable ester exchange to take place among the borates in the mixture. As a result, all the relatively long alkoxy chains will tend to attach themselves to the borate molecules which remain behind while unreacted methoxy groups will tend to form the low boiling trimethyl borate which distills out via line 21. In addition, light hydrocarbon by-products are removed in this distillate. The distillate stream is therefore fractionated in tower 23, removing light hydrocarbons overhead via line 24 and heavy by-products via line 25. The purified telogen is withdrawn via line 26 and can be recycled to reactor 10 via lines 27 and 2.

Next, free methanol is added via line 32 to the distillation residue withdrawn from tower 20 via line 31 and the mixture is distilled again. To assure a good yield of product alcohol, it is desirable to add at least three moles of methanol per mole of borate in the residue, and it is preferable to add the methanol in excess, e.g. an amount at least 10 to 50° greater than the theoretical equivalent. When distilled in tower 30 the mixture of trialkyl borate growth product and methanol equilibrates toward the formation of trimethyl borate and free higher alcohols. Since only relatively light products are required to be distilled out, tower 30 can be operated at substantially atmospheric pressure and at relatively moderate bottoms temperatures, e.g. 65–100° C. As the methyl borate is distilled out (in the form of an azeotrope with methanol) via line 33, this transesterification continues until a mixture comprising mainly only the free higher alcohols remains. During this distillation, light hydrocarbons formed in the reaction are also boiled off with trimethyl borate. The latter is desirably purified by conventional means, e.g. by salting out with a methanol soluble salt, preferably an inorganic salt such as lithium chloride or calcium chloride in vessel 35, followed by separate distillations of the methanol and the trimethyl borate phases. The purified trimethyl borate can then be recycled to the telomerization reaction via lines 36, 27 and 2. The methanol can be recycled to generator 30 via lines 34 and 31. The crude higher alcohol withdrawn as bottoms via line 38 is also preferably distilled and finished as desired, separating it into product fractions having the proper boiling range, separating any heavier hydrocarbons therefrom, etc. In this manner predominantly straight chain primary alkanols ranging from ethyl carbinol to eicosyl carbinol or higher can be prepared. Since the individual alcohols in the product mixture differ from each other by at least two carbon atoms, they can be recovered in good purity by fractional distillation.

While ethanol, propanol-2 or the like can be used instead of methanol in releasing the higher product alcohols from the growth product in tower 30, they are not nearly so advantageous as methanol since the latter regenerates trimethylborate which, for reasons stated earlier, is the preferred telogen.

The invention will next be illustrated by various examples.

EXAMPLE 1

*Ethylene-Trimethyl Borate Telomerization*

500 cc. of redistilled (B.P. 68.0° C.) trimethyl borate was added under vacuum to a one-liter stirred autoclave. The bomb was heated to 200° C. whereupon the pressure was 330 p.s.i.g. The bomb was pressured to 830 p.s.i.g. with ethylene, and a solution of 2.0 g. of di-t-butyl peroxide in 18 cc. of benzene was then added in twenty 1 cc. increments at 10-minute intervals. The total pressure was held within the limits of 830–890 p.s.i.g. by the addition of ethylene as necessary. The temperature was held at 200° C. ±1.9° during the run and for 35 minutes after the last peroxide addition. The average temperature and pressure during the run were 200.7° C. and 863.5 p.s.i.g., respectively.

After cooling, the bomb was vented, the liquid product was discharged into a distillation flask and the bomb washed with 100 cc. of trimethyl borate. The product was distilled through a 12″ Helipak column to yield:

| | Boiling point, ° C. |
|---|---|
| Cut #1, 2.9 g. | 40–52 |
| Cut #2, 46.2 g. | 52–68.9 |
| Cut #3, 454.1 g. | 68.9–69.0 |
| Cut #4, 15.3 g. | 69.0–74.0 |
| Cut #5, 11.2 g. | 74.0–79.0 |
| Residue, 51.7 g. | |

Cut #1 was shown by infrared analysis to contain 60 wt. percent trimethyl borate, 14 wt. percent acetone (from decomposition of di-tertiary butyl peroxide) and some alcohol. Cuts 2, 3 and 4 comprised principally recovered trimethyl borate. Cut #5 was shown to comprise principally benzene which was used as solvent for the peroxide initiator.

The residue was shown by infrared analysis to contain only 0.6 wt. percent of benzene; the molecular weight by benzene freezing point depression was ca. 550.

EXAMPLE 4

A run similar to run No. 1 of Example 1, with the exception that the initiator is α,α-azo-bis-isobutyronitrile and the temperature of reaction 150° C., gives an essentially similar product.

TABLE II

[Trimethyl borate telogen; reaction temperature 200° C.; initiator: di-tertiary-butyl peroxide (4 g./liter of Me borate feed)]

| Run No. | Pressure, p.s.i.g. | | | Yield of Total Telomer on Peroxide,[1] g./g. | Telomer,[1] Aver. Mol. Wt. | Product,[2] Aver. Mol. Wt. | Aver. Carbon Number [2] | Selectivity [3] on Prod.[2] | |
|---|---|---|---|---|---|---|---|---|---|
| | Total | Ethylene | Me Borate | | | | | Alcohol, percent | Olefin, percent |
| 1 | 865 | 540 | 325 | 25.7 | 550 | 269 | 17.9 | 60 | 15 |
| 6 | 675 | 350 | 325 | 23.3 | 475 | 250 | 16.6 | 65 | 12 |

[1] Before methanol exchange (but after stripping out excess trimethyl borate).
[2] After methanol exchange to release alcohol.
[3] Selectivity is mole percent as determined by infrared spectra.

*Methanol Exchange*

To a distillation flask were added 38.2 g. methanol and 38.83 g. of the distillation residue described above. On refluxing for 30 minutes all the product went in solution. The light material was distilled off through a 12" Helipak column to yield:

Cut #1, 5.06 g. B.P. 55.0–56.0° C.
Cut #2, 2.65 g. B.P. 56.0–64.5° C.
Cut #3, 38.0 g. B.P. 64.5–78.0° C.
Cut #4, 36.2 g. Residue (heavy alcohol).

The molecular weight of this alcohol residue was 269. Functional group analyses presented in Table I were obtained from infrared spectra.

In similar runs, several other telogens were tried. These data are also summarized in Table I.

EXAMPLE 5

A run similar to run No. 1 of Example 1 was made, but a reaction temperature of 250° C. and an ethylene partial pressure of 149 p.s.i. were used. Gas chromatographic analysis of the lightest 82 wt. percent of the product showed that 58 wt. percent of this fraction consisted of $n-C_3$, $n-C_5$, $n-C_7$ and $n-C_9$ primary alcohols.

EXAMPLE 6

Another run similar to run No. 1 of Example 1 was made, but a reaction temperature of 175° C. and an ethylene partial pressure of 100 p.s.i. were used. Gas chromatographic analysis of the lightest 48 wt. percent of the product showed that 70 wt. percent of this fraction consisted of $n-C_3$, $n-C_5$, $n-C_7$ and $n-C_9$ primary alcohols.

The results of Examples 5 and 6 are summarized in Table III. As is apparent therefrom, a reduction in reaction temperature has a very favorable effect on the yield of desired product.

TABLE I

[Ethylene telomerization with various telogens; 200° C. di-t-butyl peroxide]

| Run No. | Telogen | Ethylene Partial Pressure, p.s.i. | Telomer Yield on Peroxide | | Mol. Wt. | Component, percent of Heavy Prod. | |
|---|---|---|---|---|---|---|---|
| | | | g./g. | Mole/Mole | | Oxygenated | Olefinic |
| 1 | Trimethyl Borate | 539 | 26 | [1] 14 | [1] 269 | [1] 60 | [1] 15 |
| 2 | Dimethyl Carbonate | 552 | 23 | 9 | 372 | 26 | 17 |
| 3 | Methyl Benzoate | 533 | 17 | 5 | 450 | 34 | 19 |
| 4 | Dimethoxy Methane | 385 | 16 | 13 | 181 | 49 | 3 |
| 5 | Diethoxy Methane | 524 | 30 | 21 | 208 | 35 | 5 |

[1] After methanol exchange to release alcohol, in runs 2–5 the corresponding values were determined on the oxygenated products (higher alcohol precursors) and by-products, without alcoholysis.

The data show that among the compounds tabulated, methyl borate gave far and away the best yield of oxygenated products. In fact, it was the only one giving a good selectivity to higher alcohols. In run No. 1, for instance, the average alcohol chain length contained 17.9 carbon atoms. Even though the next best compound, dimethoxy methane, gave a fairly high yield of oxygenated material, the yield of product directly convertible to higher alcohols was much lower since the oxygen containing compounds in this case included considerable amounts of unwanted oxygenated by-products, especially carboxylic acid esters.

EXAMPLE 2

A comparison of the two runs summarized in Table II, below, shows that molecular weight of the alcohol product and selectivity thereto are dependent upon the ethylene pressure in the reaction.

EXAMPLE 3

A run similar to run No. 1 of Example 1, but using cumene hydroperoxide as initiator, gives an essentially similar product.

TABLE III

[Trimethyl borate telogen; initiator di-t-butyl peroxide (4 g./liter of methyl borate feed)]

| | Example 5 | Example 6 |
|---|---|---|
| Pressure, p.s.i.g.: | | |
| Total | 999 | 315 |
| Ethylene | 149 | 100 |
| Methyl Borate | 850 | 215 |
| Temperature, ° C | 250 | 175 |
| Yield of Product [1] on Peroxide, g./g | 6.5 | 14.1 |
| Product,[1] Aver. Mol. Wt | 123 | 157 |
| Average [1] Carbon No | 7.5 | 9.9 |
| Selectivity [2] on Product: [1] | | |
| Alcohol | 96 | 79 |
| Olefin, percent | <10 | <10 |

[1] After methanol exchange to release alcohols.
[2] Selectivity is mole percent as determined by infrared spectra.

It can be seen that the invention offers a ready means for producing alcohol mixtures of predetermined molecular weight. Of course, it will be understood that the molecular weight values given in Tables II and III represent average figures and that the individual alcohols in the mixture are predominantly those containing an odd number of carbon atoms per molecule; by using lower ethylene pressure, increasing amounts of n-propanol and other low molecular weight alcohols may be produced if desired.

Tables II and III also show that the crude product contains some olefinic unsaturation. This may be attributable to the presence of low molecular weight ethylene polymer in the mixture. These olefins can be separated from the mixture by means known to the art, e.g. distillation, or if desired the entire product may be saturated by a hydrogenation step before separation. The formation of the olefinic compounds is reduced at lower ethylene partial pressures. In addition, the process is attractive because of the low cost and ready availability of the principal reagents required, the ease of ester exchange of the borate esters which allows ready liberation of the alcohol product and regeneration of the boron telogen, and advantageous purification of the eventual product alcohols while in borate ester form. The higher trialkyl borates are extremely high boiling, e.g. tridecyl borate boils at 275° C. at 0.15 mm. Hg. As a result, the initial stripping to remove excess trimethyl borate may be continued to fairly high pot temperature, with vacuum if desired, to remove hydrocarbon impurities, up to boiling points beyond those of the desired product alcohols. The bottoms from stripping are then subjected to the methanolysis step and the trimethyl borate and excess methanol distilled off, leaving a mixture of higher alcohols and any high boiling hydrocarbon byproduct. The product alcohols are recovered by conventional distillation and the heavy hydrocarbon withdrawn as bottoms.

It will be understood that various modifications or variations not specifically disclosed may be used in the process of the invention without departing from the scope and spirit hereof.

Unless otherwise indicated, all proportions and percentages are expressed in this specification on a mole basis.

The invention is claimed as follows:

1. A process for making alkoxy boron compounds which comprises mixing a low molecular weight aliphatic olefin and a boron compound corresponding to the formula

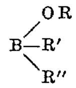

wherein R is an alkyl radical of 1 to 6 carbon atoms and R′ and R″ are selected from the group consisting of alkoxy radicals of 1 to 6 carbon atoms, alkyl radicals of 1 to 6 carbon atoms, hydrogen and halogen, and maintaining the resulting mixture at a temperature between 50° and 350° C. at superatmospheric pressure in the presence of an initiator selected from the group consisting of peroxygen compounds and α,α-azo-bis-isobutyronitrile.

2. A process according to claim 1 wherein the olefin is a normally gaseous hydrocarbon.

3. A process according to claim 1 wherein the boron compound is a trialkyl borate containing 1 to 6 carbon atoms per alkyl group.

4. The process of claim 1 wherein said peroxygen compound is hydrogen peroxide.

5. A process for making alkanols of at least three carbon atoms which comprises heating trimethyl borate and ethylene at superatmospheric pressure and a temperature of 125° to 250° C. in a reaction zone in the presence of a hydrocarbon peroxide, thereby producing a high alkyl borate ester having the formula

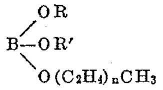

wherein $n$ is an integer ranging from 1 to 20, and R and R′ are alkyl radicals containing 1 to 20 carbon atoms, and mixing and heating the high alkyl borate ester in a generation zone with a hydroxy compound selected from the group consisting of alkanols of 1 to 3 carbon atoms and water, and recovering an alkanol having the formula $CH_3(C_2H_4)_nOH$ from the mixture.

6. A process according to claim 5 wherein an ethylene partial pressure of 20 to 1,000 pounds per square inch is maintained in the reaction zone.

7. A process according to claim 5 wherein the added hydroxy compound is methanol.

8. A process according to claim 5 wherein product alkanol and trimethyl borate are recovered from said generation zone, and the trimethyl borate is recycled to the reaction zone.

9. A process according to claim 5 wherein said hydrocarbon peroxide is cumene hydroperoxide.

10. A process according to claim 5 wherein said hydrocarbon peroxide is di-tertiary butyl peroxide.

11. A process for making an alkanol of at least three carbon atoms which comprises heating ethylene and trimethyl borate in the presence of a peroxygen compound as an initiator at a temperature between 125° and 250° C. and under an ethylene partial pressure between 50 and 750 pounds per square inch in a reaction zone, withdrawing the resulting alkyl borate containing reaction mixture from the reaction zone and passing it to a main distillation zone, heating the mixture in the main distillation zone to a temperature sufficient to distill over trimethyl borate and hydrocarbon polymers having the same boiling point as the desired product alkanol, withdrawing a distillate stream comprising trimethyl borate and hydrocarbons from the main distillation zone, passing the remaining liquid alkyl borate from the main distillation zone to a generation zone, also introducing into the generation zone at least 3 mols of methanol per mol alkyl borate, heating the resulting mixture in the generation zone to convert the alkyl borate to trimethyl borate and free alkanol, and separating trimethyl borate and the free alkanol product from the mixture.

12. A process according to claim 11 wherein a portion of the alkyl borate containing reaction mixture withdrawn from the reaction zone is recycled thereto.

13. A process according to claim 11 wherein unreacted ethylene is vented from the reaction mixture withdrawn from the reaction zone before said mixture is introduced into the main distillation zone.

14. A process according to claim 11 wherein the trimethyl borate recovered from the main distillation zone and from the generation zone is recycled after purification to the reaction zone.

15. A process according to claim 11 wherein the alkyl borate containing reaction mixture is heated in the distillation zone under reduced pressure and at a temperature at least 5° C. higher than that at which the eventual free alkanol product boils at the said reduced pressure, thereby freeing the reaction mixture of components boiling lower than the eventual alkanol product; and the alkanol product withdrawn from the generation zone is redistilled to separate higher boiling impurities therefrom.

16. A process according to claim 11 wherein a methanol soluble salt is added to the distillate from the generation zone in an amount sufficient to separate said distillate into a methanol phase and an alkyl borate phase, separately redistilling each of the said phases, recycling the redistilled methanol to the generation zone, and recycling the redistilled trimethyl borate to the reaction zone.

References Cited in the file of this patent

UNITED STATES PATENTS 1,668,797 Bannister ............... May 8, 1928

(Other references on following page)

UNITED STATES PATENTS

| | | |
|---|---|---|
| 1,886,885 | Kaufmann | Nov. 8, 1932 |
| 2,160,917 | Shoemaker et al. | June 6, 1939 |
| 2,423,497 | Harmon | July 8, 1947 |
| 2,587,753 | O'Connor et al. | Mar. 4, 1952 |
| 2,776,324 | Limerick et al. | Jan. 1, 1957 |
| 2,779,803 | Bottenberg | Jan. 29, 1957 |
| 2,862,951 | Stafiej | Dec. 2, 1958 |
| 2,875,236 | Levens et al. | Feb. 24, 1959 |
| 2,884,441 | Groszos | Apr. 28, 1959 |